United States Patent [19]

Luce

[11] 3,856,887

[45] Dec. 24, 1974

[54] FLAME RETARDANT POLYMER COMPOSITION

[75] Inventor: John B. Luce, Mount Vernon, Ind.

[73] Assignee: General Electric Company, Pittsfield, Mass.

[22] Filed: Oct. 15, 1973

[21] Appl. No.: 406,601

Related U.S. Application Data

[62] Division of Ser. No. 215,155, Jan. 3, 1972, Pat. No. 3,796,772.

[52] U.S. Cl.. 260/880 R, 260/45.7 R, 260/45.75 R, 260/45.75 N, 260/45.95 G, 260/880 B
[51] Int. Cl. .................. C08d 7/10, C08f 45/56
[58] Field of Search ..... 260/880 R, 880 B, 45.75 N, 260/45.75 R, 45.7 R, 45.95 G, 41, 41.5; 117/138

[56] References Cited

UNITED STATES PATENTS

| | | | |
|---|---|---|---|
| 2,676,927 | 4/1954 | McCurdy et al. | 260/45.7 |
| 3,311,585 | 3/1967 | Edlin | 260/29.7 |
| 3,380,847 | 4/1968 | Leoutsacos et al. | 117/138 |
| 3,686,362 | 8/1972 | Hinckley et al. | 260/45.95 |

*Primary Examiner*—V. P. Hoke
*Attorney, Agent, or Firm*—Donald M. Papuga; William F. Mufatti

[57] ABSTRACT

A flame retardant polymer composition having in admixture therewith certain titanates and halogen containing flame retardant additives.

2 Claims, No Drawings

FLAME RETARDANT POLYMER COMPOSITION

This application is a division of U.S. Patent application Ser. No. 215,155, filed Jan. 3, 1972, now U.S. Pat. No. 3,796,712, issued Mar. 1974.

The invention relates to a thermoplastic polymer composition having excellent flame retardant properties and more particularly, polymer compositions having in admixture therewith particular titanates.

BACKGROUND OF THE INVENTION

It is well known in the art to prepare flame retardant polymer compositions such as flame retardant polycarbonates by employing halogen substituted bisphenol-A in the preparation thereof. Specifically, U.S. Pat. No. 3,334,154 discloses such a composition wherein tetrabromobisphenol-A is employed to prepare a polycarbonate composition having excellent flame retardant properties. In addition, other polymers are made flame retardant by adding halogen containing flame retardant additives to such polymers as high impact polystyrenes and acrylonitrile-butadienestyrene terpolymers. Flame retardant properties of thermoplastic compositions are extremely high in demand by the industry as a safety feature requirement. In fact, many applications for thermoplastics carry the requirement that the thermoplastic be flame retardant particularly where they are used by the public or are employed in areas where the public may gather.

With the development and production of supersonic aircraft and other transportation vehicles wherein there is the need for utmost safety for passengers being carried therein, there is a great demand that the materials as supplied therein in the fabrication of such vehicles be flame retardant or nonflammable. Even though a thermoplastic may have flame retardant properties, it will, nevertheless, melt and drip upon exposure to heat. Such dripping can come into contact with combustibles and thereby cause burning of such combustibles. The modes of public transportation being developed are now using extensive amounts of plastic materials because of their high strength to weight ratio and because of the esthetic properties that they can impart to the vehicle. Therefore, the added safety requirements call for plastic materials to exhibit controlled dripping. Many of the flame retardant compositions exhibit severe dripping which is conducive to spreading fire even though such polymers may be classified as flame resistant or flame retardant polymers.

DESCRIPTION OF THE INVENTION

According to this invention, it has now been discovered that by incorporating with a flame retardant polymer certain titanate additives these polymers can be rendered non ignition of combustible material from polymer dripping such as high impact polystyrene and acrylonitrile-butadiene-styrene polymers.

Another flame retardant polymer composition of this invention consists of a terpolymer of a vinyl aromatic-acrylonitrile-butadiene having in admixture 5–30 weight percent of a halogen containing flame retardant and 0.01 to about 20 weight percent of either calcium titanate or nickel titanate or a mixture thereof. The halogen containing flame retardant additive may be typically such well known materials as hexabromobenzene, hexachlorobenzene, hexabromobiphenyl, hexachlorobiphenyl, decabromobiphenyl, decachlorobiphenyl, decabromobiphenyl ether, decachlorobiphenyl ether, 2,2-(3,3', 5,5'-tetrabromo-4,4'-dihydroxydiphenyl) propane, 2,2-(3,3', 5,5'-tetrachloro-4,4'-dihydroxy-diphenyl) propane, an adduct of cyclohexane and hexachlorocyclopentadiene (chloran), etc.

The other polymer composition of this invention consists of a styrene polymer of at least 50 weight percent of styrene having in admixture therewith 5 to 30 weight percent of a halogen containing flame retardant and 0.01 to about 20 weight percent of nickel titanate. The halogen containing flame retardant additives employed herein are the same as set forth previously. The styrene polymer may be either a styrene homopolymer or a styrene copolymer of at least 50 weight percent of styrene with the balance being any other monomer copolymerizeable with styrene monomer. This also includes the high impact polystyrene which are prepared by polymerizing styrene in the presence of polybutadiene to graft copolymerize the polybutadiene onto the styrene polymer chain that is formed during polymerization of the styrene monomer. Also included are the styrene-butadiene block and random copolymers wherein the butadiene may be present in an amount of from 10–50 weight percent of the styrene polymer.

The halogens employed in all cases are of either the halogen substituted dihydric phenols or the halogen containing flame retardant additives are bromine or chlorine mixtures thereof in the same compound or monomer.

DESCRIPTION OF THE PREFERRED EMBODIMENT

The following Example is set forth herein to illustrate in more detail the preferred embodiment and to illustrate more clearly the principal and practice of this invention to those skilled in the art.

EXAMPLE I

A blend of 8 parts of high impact polystyrene and 2 parts of hexabromobenzene is prepared. This mixture is then blended with 1.0 weight percent of nickel titanate. The mixture is extruded and injection molded into test bars.

The test bars are subjected to the U.L. Bulletin 94 Flame Test. Test bars without the nickel titanate are also prepared. The results are as follows:

TABLE 1

| Additive | Flame Out (Seconds) |
| --- | --- |
| 0 | 15 sec.* |
| Nickel titanate | 10 sec.** |

*Dripping of the polymer occurred and ignited cotton underlayment.
**Dripping of the polymer occurred but of the non-flaming type and did not ignite cotton underlayment.

As shown in the Example, the addition of the particular titanate with the flame retardant polymer prevented ignition of the combustion material around it. It is the combination of the titanate with the halogen that offers this effect. Without the titanate additive, even the so-called flame retardant polymers caused burning of combustible material due to dripping polymer.

In the practice of this invention, the other halogen flame retardant additives set forth previously can be employed in place of the hexabromobenzene used in the Example with essentially the same results.

It will thus be seen that the objects set forth above among those made apparent from the preceding description are efficiently attained and since certain changes may be made in carrying out the above process and in the composition set forth without departing from the scope of this invention, it is intended that all matters contained in the above description shall be interpreted as illustrative and not in a limiting sense.

What is claimed is:

1. A flame retardant polymer composition comprising in admixture a styrene polymer selected from the group consisting of a styrene homopolymer and a copolymer of styrene of at least 50 weight percent styrene, 5–30 weight percent of a halogen containing flame retardant additive and 0.01 to about 20.0 weight percent of nickel titanate; said halogen being selected from the group consisting of bromine and chlorine.

2. The composition of claim 1 wherein the styrene polymer is a copolymer of 50 weight percent of styrene and, correspondingly, 50 weight percent of butadiene.

* * * * *